(12) United States Patent
Lin et al.

(10) Patent No.: US 10,783,427 B2
(45) Date of Patent: Sep. 22, 2020

(54) METHOD FOR ACCUMULATING AND SHARING BEADS ROTATION DATA

(71) Applicants: INVENTEC (PUDONG) TECHNOLOGY CORPORATION, Shanghai (CN); INVENTEC CORPORATION, Taipei (TW)

(72) Inventors: Chun-Chi Lin, Taipei (TW); I-Fang Chen, Taipei (TW); Szu-Yu Huang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/276,097

(22) Filed: Feb. 14, 2019

(65) Prior Publication Data

US 2019/0251416 A1 Aug. 15, 2019

(30) Foreign Application Priority Data

Feb. 14, 2018 (CN) .......................... 2018 1 0152015

(51) Int. Cl.
*G06M 1/27* (2006.01)
*H04L 12/58* (2006.01)
*G01D 7/00* (2006.01)

(52) U.S. Cl.
CPC ................ *G06M 1/27* (2013.01); *G01D 7/00* (2013.01); *H04L 51/046* (2013.01)

(58) Field of Classification Search
CPC ............................... G06M 1/27; H04L 51/046
USPC .......................................................... 235/375
See application file for complete search history.

(56) References Cited

U.S. PATENT DOCUMENTS

| 9,582,080 B1 * | 2/2017 | Tilton ...................... G06F 3/017 |
| 2003/0086521 A1 * | 5/2003 | Rana ........................ A44C 23/00 377/3 |
| 2016/0092707 A1 * | 3/2016 | Madkour ............... A44C 23/00 340/10.1 |

* cited by examiner

*Primary Examiner* — Toan C Ly
(74) *Attorney, Agent, or Firm* — Maschoff Brennan

(57) ABSTRACT

A method for accumulating and sharing beads rotation data with the method adapted to a bead string communicatively connecting to a communication device, and with the method comprises: generating a measurement signal by the bead string; receiving the measurement signal by a communication unit of the communication device; determining whether the measurement signal conforms to an accumulation amount by a computing unit of the communication device; and generating the beads rotation data and displaying the beads rotation data by a displaying unit of the communication device, wherein the beads rotation data comprises a number of beads rotations or a time of beads rotation.

9 Claims, 1 Drawing Sheet

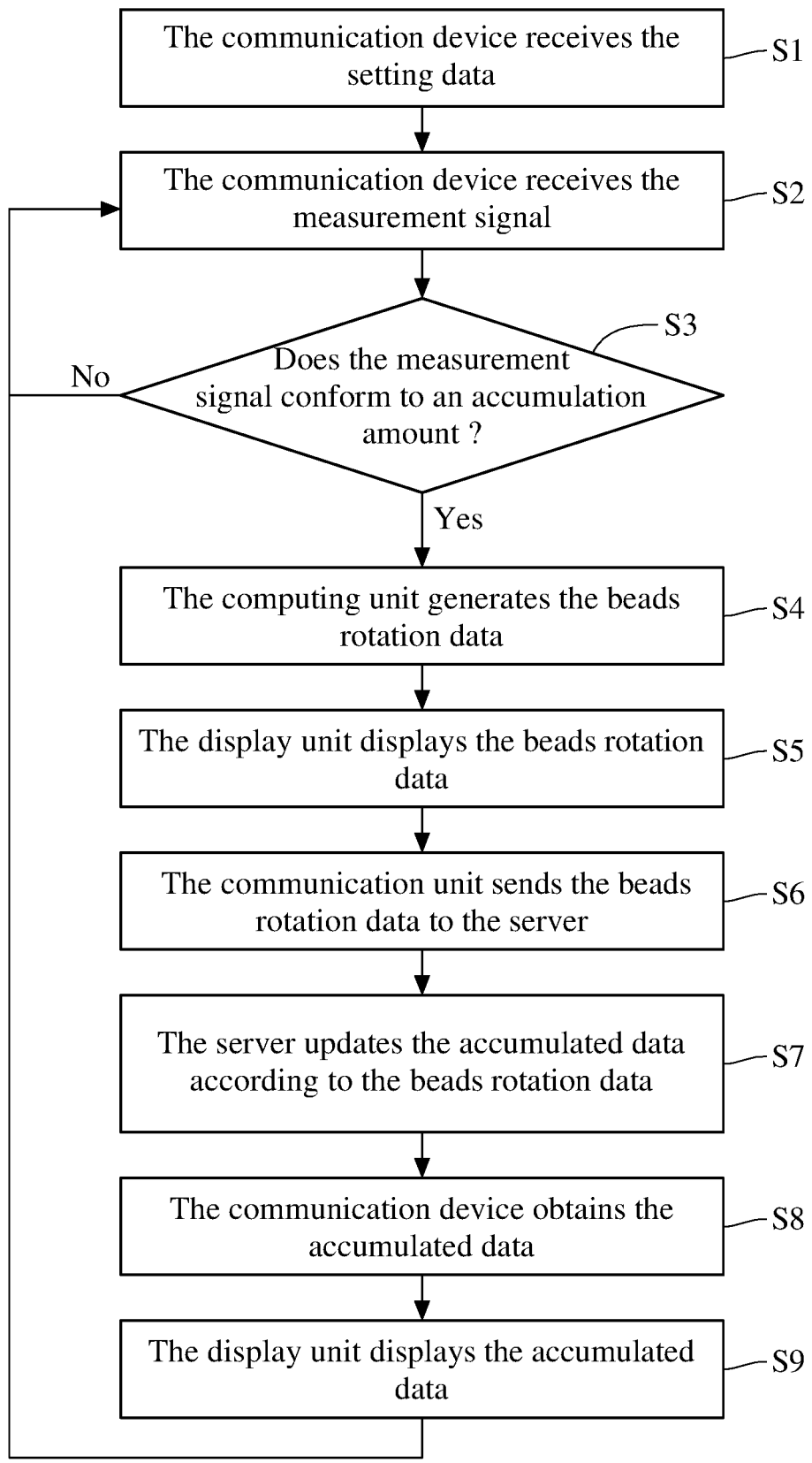

METHOD FOR ACCUMULATING AND SHARING BEADS ROTATION DATA

CROSS-REFERENCE TO RELATED APPLICATIONS

This non-provisional application claims priority under 35 U.S.C. § 119(a) on Patent Application No(s). 201810152015.8 filed in China on Feb. 14, 2018, the entire contents of which are hereby incorporated by reference.

BACKGROUND

1. Technical Field

This disclosure relates to a method for accumulating and sharing beads rotation data, and more particularly to a method performed by a bead string with a sensor, a communication device, and a server.

2. Related Art

Buddhist prayer beads, also known as Buddhist rosaries, are an important tool that Buddhists often use when they recite a Buddhist mantra or Buddha's name. Although the bead string serves as a small and simple counting device itself, it is still necessary for a busy modern person to use other tools such as a counter or a pen for handwriting to record a chanting number in order to continue the pray interrupted or disturbed by the chores and to avoid forgetting the number of chants.

However, the conventional counting method requires the user to hold the bead string by one hand and press the counter or write the number of times by another hand. This method makes the user feel flustered and cannot concentrate on immersed recitation (repetitions of a Buddha's name), and is not a very friendly experience. In addition, each recorded beads rotation data cannot be traced back in the future if there is no effective recording mechanism. Furthermore, Buddhist groups often hold a variety of group practices, but these activities need participants to join in the same space and at the same time. Therefore, participants must arrange their schedule to participate. However, it is usually difficult to arrange a group practice in a time period wherein every member is free to attend the group practice.

SUMMARY

According to an embodiment of the present disclosure, a method for accumulating and sharing beads rotation data with the method adapted to a bead string communicatively connecting to a communication device, and the method comprises: generating a measurement signal by the bead string; receiving the measurement signal by a communication unit of the communication device; determining whether the measurement signal conforms to an accumulation amount by a computing unit of the communication device; and generating the beads rotation data and displaying the beads rotation data by a displaying unit of the communication device when the measurement signal conforms to the accumulation amount, wherein the beads rotation data comprises a number of bead rotations or a time of bead rotations.

According to an embodiment of the present disclosure, a method for accumulating and sharing beads rotation data further comprises: sending the beads rotation data to the server by the communication unit; updating an accumulated data associated with the beads rotation data by the server; and after updating the accumulated data by the server, obtaining the accumulated data from the server by the communication unit and displaying the accumulated data by the displaying unit.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

The FIGURE is a flowchart of the method for accumulating and sharing beads rotation data according to an embodiment of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The method for accumulating and sharing beads rotation data is adapted to a bead string, the bead string communicatively connects to a communication device, the communication device communicatively connects to a server. Practically, the bead string is concatenated by a plurality of Buddhist prayer beads, one or some of these beads comprises sensor(s) for detecting the bead's rotation state and send a measurement signal to a paired communication device. The communication device is, for example, a smartphone or a tablet computer. The method for accumulating and sharing beads rotation data can be implemented by a specific App (application) running on a smartphone, a tablet computer, or any hardware that can receive the aforementioned measurement signal and processing thereof, the present disclosure does not limit thereto. The server is such a cloud storage equipment or a private computer able to connect to the internet. The present disclosure does not limit the hardware structure of the server.

The figure is a flowchart of the method for accumulating and sharing beads rotation data according to an embodiment of the present disclosure. Please refer to step S1, "The communication device receives the setting data". Specifically, the communication device receives the setting data before receiving the measurement signal. For example, said setting data is at least one of a number of beads of the bead string, an identifier of the bead string and a default credit. In practical, a communication connection between a bead string and a communication device needs to be established before a user uses the bead string to perform the recitation. Regarding the manner of establishment of a communication connection, for example, the bead string sends the number of beads or the identifier to the communication device, and the communication unit of the communication device receives and stores the above setting data, and thus the communication device can identify the paired bead string. On the other hand, before using the bead string to perform the recitation, the user can input a default credit of the recitation as an evaluation index for the progress of the subsequent inspection.

Please refer to step S2 of the figure, "The communication device receives the measurement signal". Specifically, the sensor in the bead string will generate a measurement signal and send this signal in the manner of wireless communication when the user starts to rotate the bead string. The type of measurement signal is such as tri-axial acceleration or angular velocity and the present disclosure does not limit thereto. Said wireless communication is such as Bluetooth, BLE (Bluetooth low energy), ZigBee, or NFC (Near-field communication). The communication unit of the communication device receives the measurement signal generated by the bead string through one of the above types of wireless communication.

Please refer to step S3 of the figure, "determining whether the measurement signal conforms to an accumulation amount". Specifically, after receiving the aforementioned measurement signals, the communication device uses its computing unit to perform an algorithm to check whether the measurement signal can correspond to a normal beads rotation. For example, the user's finger (usually using his/her thumb) turns the bead string for a specified bead (usually the Guru bead) to leave and go back to the user's hand repeatedly, and the above progress can be taken as a "normal beads rotation". If the measurement conforms to the accumulation amount, the step S4, generating the beads rotation data by the computing unit, as shown in the figure will be performed next. The beads rotation data is the number of bead rotations of the time of bead rotations. Please refer to step S5, "The display unit displays the beads rotation data". If the computing unit determines that the measurement signal does not conform to the accumulation amount, the step S2 is then performed for the measurement signal next time. Through the method for accumulating beads rotation data of steps S2-S5, the user can concentrate on beads rotation and recitation, and the statistics data of this progress are completed automatically by the bead string and the communication device communicatively connecting to the bead string. The user does not need to use an additional counter or a time to calculate the number of bead rotations or the time of the bead rotations, and the user can view the current progress by the displaying unit of the communication device.

As described above, the method further comprises: determining whether the current beads rotation data is greater than or equal to the default credit, thereby ensuring whether the user has achieved the target set by himself. For example, the target is rotating the bead string for 500 turns or 60 minutes. When the computing unit determines that the accumulated beads rotation data has reached the default credit, the computing unit generates a goal-reaching signal and controls the displaying unit to display an image, a video, or a text associated with the goal-reaching signal to notify the user. The goal-reaching signal can remind the user by vibration or ringing when the communication device is a smartphone. Furthermore, in order to enhance the willingness and fun of the Buddha recitation and increase the fulfillment and satisfaction, the computing unit can control the display unit to generate a series of progressive images according to the completion ratio of the current beads rotation data relative to the default credit. For example, use the blooming lotus to represent the user's current progress in the beads rotation process, so that the people can get a feeling of satisfaction of merits and virtues.

As described above, after the computing updates the number of bead rotations or the time of bead rotation, the method according to an embodiment of the present disclosure further comprises: storing the newest generated beads rotation data to the storage unit of the communication device. Therefore, when the user switches from the original beads rotation schedule to another new beads rotation schedule, the beads rotation data recorded in the computing unit can stay in an initial state to restart accumulating the beads rotation data.

Please refer to step S6 of the figure, "The communication unit sends the beads rotation data to the server". As mentioned in the previous paragraph, the computing unit generates the beads rotation data and stores it to the storage unit, so the user can control the communication device to read this storage unit at any time to review the previous record. However, once the communication device is damaged or lost, and the user does not perform a data backup regularly, the beads rotation data previously recorded in the storage unit of the communication device is still unrecoverable. In order to allow the user to review the recitation record at any time, the method for accumulating and sharing the beads rotation data according to an embodiment of the present disclosure uses the "cloud storage space" to permanently store the old data. The user can track or analyze past records through the application running on the communication device, so that the beads rotation data is digitized and trackable.

Please refer to step S7 of the figure, "The server updates the accumulated data according to the beads rotation data". Said accumulated data is, for example, the beads rotation data stored separately by each user, or an accumulated result of all beads rotation data of multiple users. In practical, in order to make the common group practices more flexible, the method of accumulating and sharing beads rotation data according to an embodiment of the present disclosure adopts the manner of "online participation" so that multiple users can use their bead strings and communication devices to contribute their own beads rotation data in different space and different time. Please refer to step S8 of the figure, "The communication device obtains the accumulated data", and step S9, "The displaying unit displays the accumulated data". For example, the user can check the community platform to known the available group practices. When the user chooses one of the group practices which he or she will attend, his or her communication device may perform the aforementioned steps S8 and S9 to obtain the latest accumulated data of this group practice and notify the user by displaying the accumulated data through the displaying unit. Even if there are multiple people performing recitation together at the same time, the user can view the real-time instant data summation running on the cloud server to know the total amount accumulated so far. In addition, the notification function of the smartphone can be used to actively generate a message to tell the user about the remaining amount relative to the group practice's target. The user will be more engaged to the group practice when he or she uses the "real-time instant data summation" function running on the communication device, and thus the target of the group practice may be reached more quickly.

As described above, in addition to joining the existing group practices, the user can also create a new group practice by himself (herself), and set the content of this new group practice such as the type of recitation, the goal, the duration, the inviters, whether to make this activity public.

Specifically, the user uses the communication unit of the communication device to create a receiving group to receive a sharing credit from another communication device. The beads rotation data can be updated after the sharing credit is received, and thus the turning number of bead rotations and the time of bead rotations can be shared with others. In order to improve the interactivity between the users and to promote the studying of Buddha, in addition to make the group practices online, the present disclosure further adopts the "immediate message" of the community platform for users to encourage and motivate each other by posting messages on the community platform during the progress of the group practice, thereby increasing the rate of achievement of the group practice. Furthermore, after the goal of the group practice is achieved, a user can share the result on the community, which not only increases the sense of accomplishment but also indirectly enhances the popularity.

In addition to the group practices described above, the method of accumulating and sharing beads rotation data according to an embedment of the present disclosure also consider the manner of "transfer of merit". Specifically, after reaching the default credit, the user can decide a sharing credit and a specific user to receive the sharing credit. Said sharing credit is smaller than or equal to the beads rotation data. The user sends the sharing credit to the designated user's said another communication device through the communication unit of the communication device. After the sharing credit is sent, steps S4-S9 are performed again for updating the beads rotation data stored in the storage unit and online server by the computing unit (such as deducting the amount of the sharing credit from the completed number of bead rotations). On the other hand, the user can also receive the sharing credit of transfer of merit from others. In practical, the aforementioned beads rotation data generated by the computing unit of the communication device is the first beads rotation data, the user create a receiving group by the communication unit of the communication device. The receiving group is configured to receive a second beads rotation data from another communication device and perform steps S4-S9 again for updating the first beads rotation data by the computing unit. The number of people of the receiving group can be determined by the user, so the receiving group is configured for one-to-one transfer of merit return or many-to-one transfer of merit.

In summary, the method for accumulating and sharing the beads rotation data proposed according to an embodiment of the present disclosure uses the computing unit of the communication device to detect whether the measurement signal sent by the bead string conforms to the accumulation amount. Therefore, human factors leading to counting errors can be avoided. On the other hand, the beads rotation data can be preserved every time and the past record can be reviewed at any time by sending the beads rotation data to the server and updating the accumulated data by the communication unit of the communication device. In addition, the server can simultaneously receive the number of bead rotations from multiple communication devices for the same group practice. Therefore, multiple users can complete the group practice with others in different spaces and time. Online remote group practice and immediate progress tracking of group practice can be achieved accordingly.

What is claimed is:

1. A method for accumulating and sharing beads rotation data with the method adapted to a bead string communicatively connecting to a communication device, and with the method comprising:
generating a measurement signal by the bead string;
receiving the measurement signal by a communication unit of the communication device;
determining whether the measurement signal conforms to an accumulation amount by a computing unit of the communication device; and
generating the beads rotation data and displaying the beads rotation data by a displaying unit of the communication device when the measurement signal conforms to the accumulation amount, wherein the beads rotation data comprises a time of bead rotations;
wherein the method further comprises receiving a setting data by the communication device before the communication unit of the communication device receives the measurement signal.

2. The method for accumulating and sharing beads rotation data of claim 1 with the communication device communicative connecting to a server and the method comprising:
sending the bead rotation data to the server by the communication unit;
updating an accumulated data associated with the beads rotation data by the server; and
after updating the accumulated data by the server, obtaining the accumulated data from the server by the communication unit and displaying the accumulated data by the displaying unit.

3. The method for accumulating and sharing a beads rotation data of claim 1, wherein the setting data comprises: at least one of a number of beads of the bead string, an identifier of the bead string and a default credit.

4. The method of accumulating and sharing a beads rotation data of claim 3 further comprising: generating a goal-reaching signal by the computing unit and display an image, a video, or a text associated with the goal-reaching signal when the beads rotation data is greater or equal to the default credit.

5. The method for accumulating and sharing a beads rotation data of claim 1 further comprising:
when the measurement signal conforms to the accumulation amount, storing the beads rotation data by a storage unit of the communication device.

6. The method for accumulating and sharing a beads rotation data of claim 5 further comprising:
sending a sharing credit to another communication device by the communication unit, wherein the sharing credit is less than or equal to the beads rotation data; and
updating the beads rotation data by the storage unit after the sharing credit is sent.

7. The method for accumulating and sharing a beads rotation data of claim 5, wherein the beads rotation data is a first beads rotation data and the method further comprises:
establishing a receiving group configured to receive a second beads rotation data sent by another communication device; and
updating the first beads rotation data by the storage unit after the second beads rotation data is received.

8. The method for accumulating and sharing a beads rotation data of claim 1, wherein the communication device is a smartphone.

9. The method for accumulating and sharing a beads rotation data of claim 1, further comprising:
when the computing unit determines that the measurement signal does not conform to the accumulation amount, receiving the measurement signal by the communication unit of the communication device again.

* * * * *